(12) United States Patent
Curran et al.

(10) Patent No.: US 8,182,107 B2
(45) Date of Patent: May 22, 2012

(54) LED LUMINAIRE MADE WITH RECYCLED MATERIALS

(75) Inventors: John William Curran, Lebanon, NJ (US); Shawn Patrick Keeney, Eatontown, NJ (US)

(73) Assignee: LED Transformations, LLC, Lebanon, NJ (US)

( * ) Notice: Subject to any disclaimer, the term of this patent is extended or adjusted under 35 U.S.C. 154(b) by 288 days.

(21) Appl. No.: 12/583,490

(22) Filed: Aug. 21, 2009

(65) Prior Publication Data

US 2010/0046208 A1    Feb. 25, 2010

Related U.S. Application Data

(60) Provisional application No. 61/091,418, filed on Aug. 24, 2008.

(51) Int. Cl.
*F21V 33/00*    (2006.01)

(52) U.S. Cl. ........ 362/101; 362/147; 362/294; 362/404; 362/405

(58) Field of Classification Search ................ 362/101, 362/147, 294, 318, 404, 405
See application file for complete search history.

(56) References Cited

U.S. PATENT DOCUMENTS

| | | | |
|---|---|---|---|
| 6,254,247 B1 * | 7/2001 | Carson | 362/101 |
| 7,914,165 B2 * | 3/2011 | Bertken | 362/101 |
| 2007/0201220 A1 * | 8/2007 | Ulicny | 362/101 |
| 2009/0046456 A1 * | 2/2009 | Urano et al. | 362/235 |

* cited by examiner

*Primary Examiner* — Stephen F Husar
*Assistant Examiner* — James Cranson, Jr.

(57) ABSTRACT

A method and apparatus for providing a luminaire employing at least one Light Emitting Diode (LED) device as the light source and a metal beverage container as the luminaire housing.

6 Claims, 4 Drawing Sheets

LED LUMINAIRE MADE WITH RECYCLED MATERIALS

CROSS-REFERENCE TO RELATED APPLICATIONS

This application claims the benefit of U.S. Provisional Application No. 61091418 filed on Aug. 24, 2008, which is herein incorporated by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The present invention relates generally to a lighting fixture, and more particularly to an LED-based lighting fixture.

Over the past several years, the use of high power LEDs in lighting fixtures has increased significantly as device performance increases to a level where general illumination applications become practical. More and more applications such as task lighting and area lighting can be achieved using LEDs as the light source. Their high energy efficiency and small size make LEDs ideal candidates for such lighting fixtures. Traditional lighting luminaires often do not provide for the thermal management required by LED devices. In addition, the fixtures are much larger than necessary due to the historic size of more traditional light sources. Such fixtures do not take advantage of the small size of LED devices.

Luminaires are typically fabricated from new raw metals, typically aluminum, steel or brass. Each new fixture requires additional natural resources to produce the metals, even if, as in the case of aluminum, the metal is recycled. During the course of a year, this results in tons of raw material that must be produced, with the corresponding output of greenhouse gases which is a byproduct of the energy generated to produce the metal stock. The energy requirement for producing new lighting fixtures is a major disadvantage of the present approach. Cost to produce these fixtures is a second disadvantage.

SUMMARY OF THE INVENTION

In one embodiment, the present invention provides a means of producing energy efficient lighting by combining the performance characteristics of Light Emitting Diodes (LEDs) with the thermal dissipation properties of recycled metal beverage containers. In another embodiment, the present invention provides a means of producing energy efficient lighting by combining the performance characteristics of LEDs combined with the thermal dissipation properties of non-recycled metal beverage containers.

BRIEF DESCRIPTION OF THE DRAWINGS

So that the manner in which the above recited features of the present invention are attained and can be understood in detail, a more particular description of the invention, briefly summarized above, may be had by reference to the embodiments thereof, which are illustrated in the appended drawings.

It is to be noted, however, that the appended drawings illustrate only typical embodiments of this invention and are therefore not to be considered limited of its scope, for the invention may admit to other equally effective embodiments.

Figure 1:
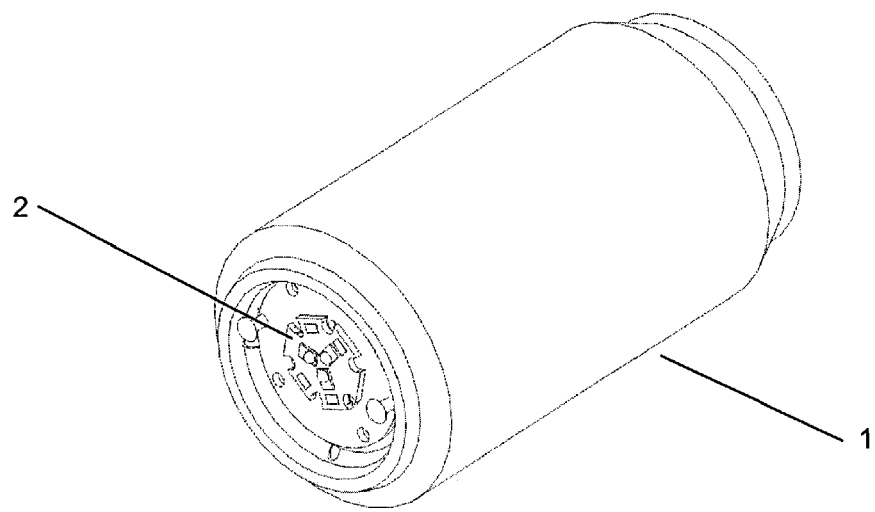

The LEDs are shown in FIG. 1 mounted to a suitable printed circuit board which, in turn, is mounted to the underside of the beverage container. The printed circuit board must be capable of conducting the heat generated by the LEDs to the beverage container. One common way of achieving this effect is by the use of what are known as Metal Core Printed Circuit Boards or Metal Clad printed Circuit Boards (MCPCBs).

Figure 2:
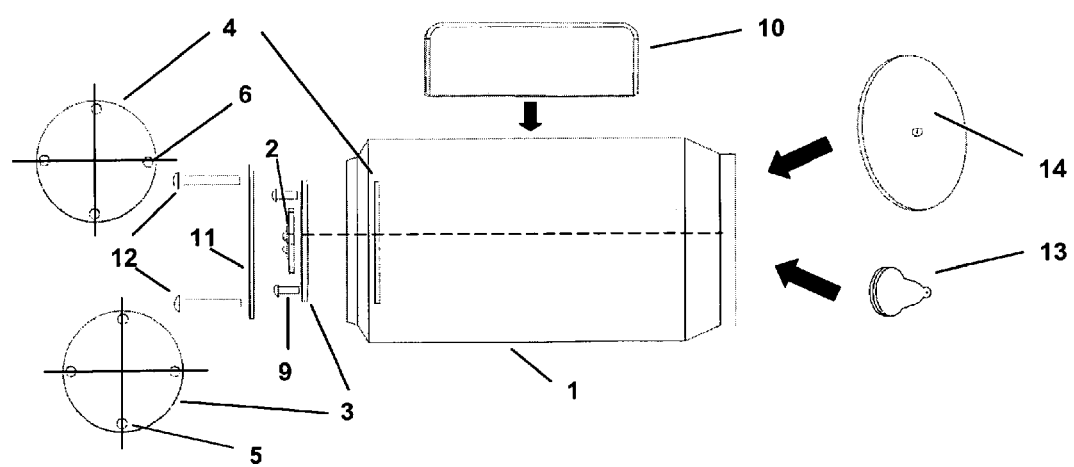

FIG. 2 shows the elements, which make up one preferred embodiment of the invention.

Figure 3:
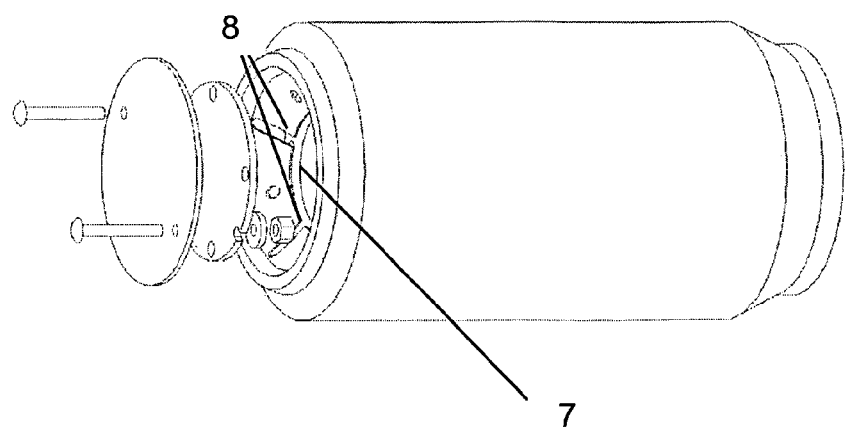

The top and bottom plates between which the bottom of the metal beverage container are flattened is shown in FIG. 3. Also shown is a hole used in one preferred embodiment to allow the bottom of the metal beverage container to be flattened between the two plates, thus assuring adequate thermal contact between these plates and the beverage container.

Figure 4:
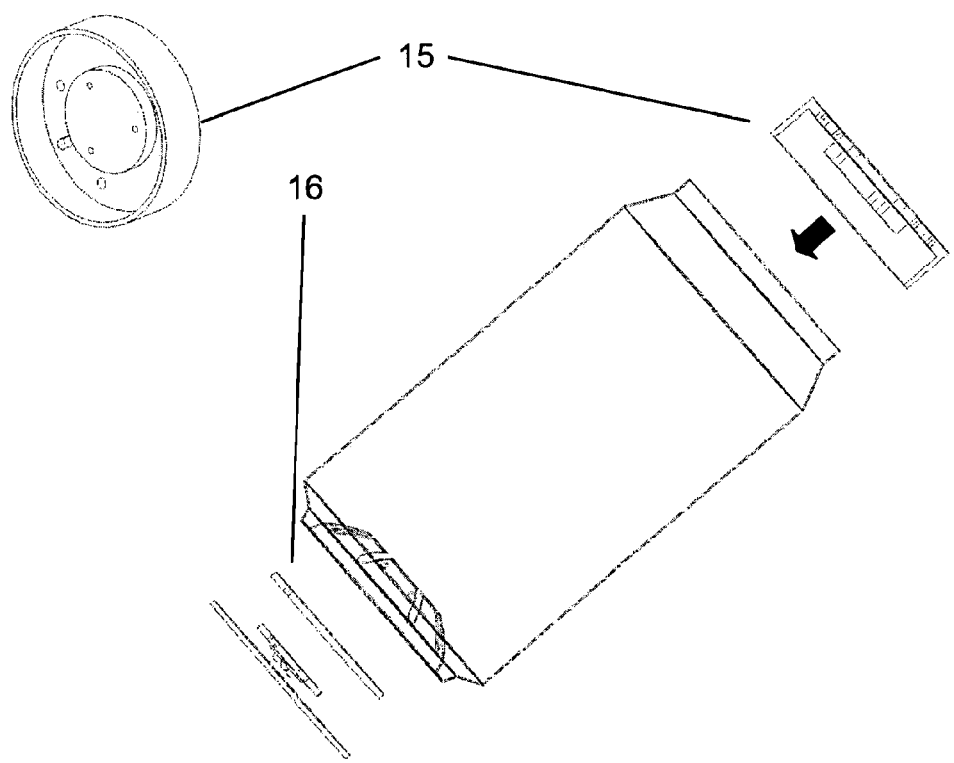

In another preferred embodiment, the top of the metal beverage container is removed and replaced with a cap. This embodiment is shown in FIG. 4.

Figure 5:
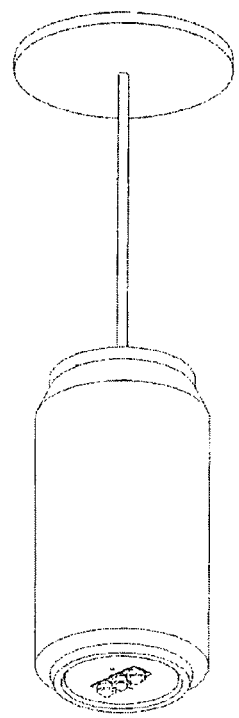

FIG. 5 shows one configuration of the invention with the unit hung in the form of a pendent light.

Figure 6:
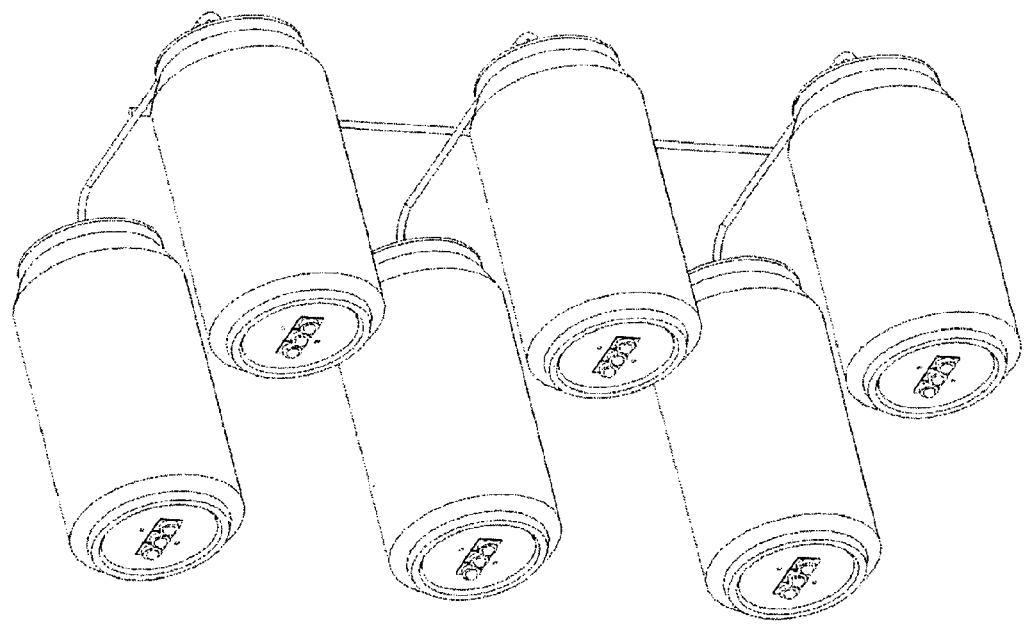

FIG. 6 shows a second configuration of the invention with six of the units assembled in the form of an area light.

Figure 7:
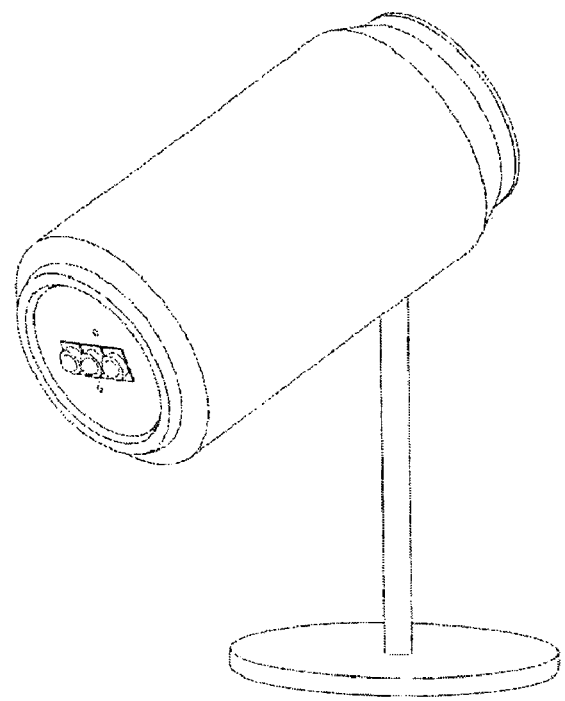

FIG. 7 shows a third configuration of the invention with the unit attached to a base in the form of a desk lamp.

Figure 8:
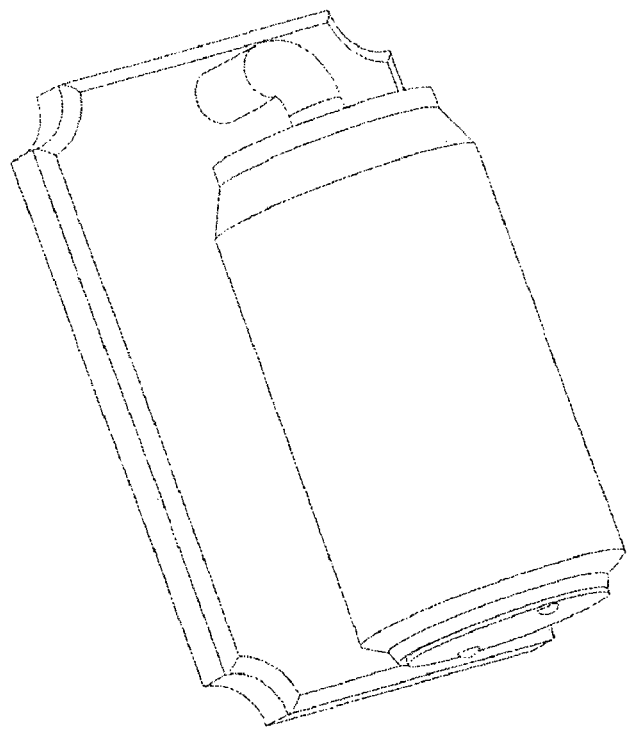

FIG. 8 shows a fourth configuration of the invention with the unit attached to a plate in the form of a wall sconce.

The above configurations of the invention are examples of how the invention could be used to form various lighting fixtures and are not to be considered limiting the scope of such fixtures. Any lighting fixture is to be considered as a potential configuration for this invention.

DETAILED DESCRIPTION OF THE INVENTION

The present invention involves the use of metal beverage containers to produce luminaires suitable for use with LED light sources. One key element recognized by the inventors was the fact that the thermal conductivity of such containers was suitable to provide a mechanism for removal of the heat generated by the LED light sources. Use of containers such as beer, soft drink or juice cans are examples of the types of containers envisioned by this invention, although any metal beverage container with thermal properties similar to aluminum, steel or copper would be within the scope of this invention. The containers should be of such size that their resulting surface area is sufficient to allow proper thermal management of the LEDs used with the containers. Many heat sink manufacturers provide guidance as to calculating the required surface area.[1,2] Both new and recycled (reused) containers are within the scope of this invention

[1] Wakefield Thermal Solutions, "An Introduction to Heatsinks and Cooling," Vol. 1.01, 2004
[2] S. Lee, "How To Select a Heat Sink," Aavid Thermal Technologies The small size of the LED light sources is also a key element of the present invention. The inventors recognized that, due to their very low profile, LED light sources could easily fit within the base or top of a typical metal beverage container as shown in FIG. 1, allowing the container to form the luminaire. These LED light sources can be mounted to the container (#1 in FIG. 1) in the form of an LED Light Engine, which typically consists of one or more LED devices mounted to a printed circuit board having the proper thermal characteristics to transfer the thermal energy away from the LEDs. This approach is shown in #2 in FIG. 1, although any means of attaching the one or more LED devices to the container is within the scope of this invention.

The LEDs light sources used in this invention can be made up of LED devices of any wavelength or combinations of wavelengths. Depending on the desired application, the LED devices can be single or multi-chip packages with multi-chip packages made up of the same or different color dies.

One embodiment of the present invention is shown in FIG. 2. The invention makes use of two thin aluminum spacers (3 and 4). One spacer (3) has a number of holes (5) spaced around the axis of the spacer; the second spacer (4) has corresponding tapped holes (6) spaced around its axis. A hole (7 in FIG. 3) is cut in the bottom of the metal beverage container along with a number of slots (8 in FIG. 3). This hole allows access to the interior of the container in order to route wiring as well as allow placement of the electronics (10 in FIG. 2) used to power the LEDs. The bottom spacer is inserted into the container through the slots and then positioned flat against the bottom of the interior of the container. The top spacer is placed on the outside surface of the bottom of the container and fastened to the bottom spacer using screws (9 in FIG. 2) as shown in the figure. As the top spacer is tightened down against the bottom spacer, the edges of the bottom of the metal beverage container are captured between the two spacers and flattened out to form good thermal contact between the top spacer and the container bottom.

When tightened, the top spacer provides a smooth flat surface on the bottom or top of the container to which a LED light engine can be attached. This surface allows efficient thermal transfer of heat from the light engine to the container, where it can be conducted to the walls of the container and dissipated into the surrounding air.

If a zip-top tab is present at the top of the container, it can be bent back into the container. Any number of means can be used to seal this opening and to provide passage and strain relief for the electrical and/or support wiring through the top of the container and are within the scope of this invention. For example, the entire top of the container can be covered with a potting or sealing compound to create a watertight plug on the top of the container and to provide strain relief for the exiting wiring. Alternatively, a plug (13 in FIG. 2) in roughly the shape of the zip top opening can be fabricated and pushed into the zip top hole to seal the unit against moisture and to provide the necessary strain relief. A third approach would be to insert a spacer (14 in FIG. 2) with a small nipple as shown through the opening at the bottom of the container. The spacer is attached to the top of the container by some mechanical means (e.g. screws, rivets, etc.). A small hole is drilled in the center of the top of the container, which allows the nipple to pass through. This nipple allows the electrical and/or support wiring to pass through the top of the container and act as a strain relief. The spacer acts to cover the hole left by removal of the zip-top tab (if present).

Since the LEDs are low voltage devices, a lens cover (11 in FIG. 2) is optional. However, the present invention envisions a clear plastic cover with a diameter, which matches the interior of the diameter of the bottom of the container. If such a lens cover is desired or necessary, any number of means of fastening of this cover to the container can be used and are within the scope of this invention. For example the cover can be sized to press fit into the opening. Alternatively, it can be fixed in place using adhesive of some type. A third means would use mechanical fasteners (12 in FIG. 2) such as screws, rivets or snaps to attach the cover to the container. Such a cover would be necessary for outdoor applications. This cover can have optical features incorporated within it in order to provide desired light distribution patterns from the fixture.

A second embodiment of the present invention envisions cutting away the top of the container. With complete access to the interior of the container, the bottom of the container can be flattened and the LED light engine attached directly to the bottom of the container to form good thermal contact between the LED light engine and the container bottom. All wiring and required electronics can be placed in the container and then the container can be sealed by filling the interior of the container with some type of potting or other sealing material. Alternatively, a new top can be fabricated for the container and attached via some mechanical means (e.g. screws, rivets, etc.). Either the potting/sealing material or the new top embodiments would provide the proper strain relief for the electrical and/or support wiring exiting the top of the container.

A third embodiment of the present invention envisions using new containers prior to their final assembly at the factory (e.g. before the lids have been attached). With complete access to the interior of the container, the bottom of the container can be flattened and the LED light engine attached directly to the bottom of the container to form good thermal contact between the LED light engine and the container bottom. All wiring and required electronics can be placed in the container and then the container can be sealed by attaching the top using the same final assembly step used with all new containers. With access to the container lid, a spacer (as previously shown in FIG. 2, item 11) with a small nipple could be attached to the top of the container by some mechanical means (e.g. screws, rivets, etc.). A small hole is drilled in the center of the top of the container, which allows the nipple to pass through. This nipple allows the electrical and/or support wiring to pass through the top of the container and act as a strain relief. Numerous other means of providing strain relief for the electrical/support wiring are possible and are within the scope of this invention.

A fourth embodiment of the present invention incorporates a metal insert (15) with a raised center platform as shown in FIG. 4. This component is inserted through the top of the container, which has been removed. A spacer (16) with a large center hole fits around the raised platform of the insert and is attached to the insert using screws, rivets or other mechanical means. The spacer and insert when tightened, form a good thermal contact with the container bottom. The LED light engine can be attached to the spacer/insert.

A further embodiment of the present invention attaches the beverage container luminaire via supporting wires to a fixture to form a pendant lighting fixture as shown in FIG. 5.

A further embodiment of the present invention attaches a quantity of two or more beverage container luminaires together to form an area lighting fixture as shown in FIG. 6.

A further embodiment of the present invention attaches a support to the beverage container luminaire to attach it to a base to form a desk lamp fixture as shown in FIG. 7.

A further embodiment of the present invention attaches the beverage container luminaire to a wood or metal plate to form a wall sconce fixture as shown in FIG. 8.

What is claimed is:
1. A luminaire comprising: at least one Light Emitting Diode (LED) device, a metal beverage container to which the at least one LED can be fastened, an electronic driver circuit for supplying proper voltage and current to the at least one LED, at least one thermally conductive plate to provide a suitable surface for the at least one LED to be fastened to the metal beverage container in which at least one opening is cut in the surface of the beverage container to allow the surface of the metal beverage container to be flattened in order to provide a better thermal path from the at least one thermally conductive plate to the outside of the metal beverage container.

2. The luminaire of claim 1 where the at least one opening allows access to the interior of the container in order to route wiring and to locate the drive electronics within the metal beverage container if desired.

3. The luminaire of claim 1 where a second thermally conductive plate is placed inside the metal beverage container and attached via mechanical means to the first thermally conductive plate on the outside of the metal beverage container, capturing a portion of the metal beverage container between the two plates and forming a thermal path from the first plate to the metal beverage container.

4. A luminaire comprising: at least one Light Emitting Diode (LED) device, a metal beverage container to which the at least one LED can be fastened, a means for supplying proper voltage and current to the at least one LED, a means for providing a suitable surface for the at least one LED to be fastened to the metal beverage container where that means consists of at least one opening cut in the surface of the beverage container to allow the surface of the metal beverage container to be flattened in order to provide a better thermal path from the at least one thermally conductive plate to the outside of the metal beverage container.

5. The luminaire of claim 4 where the means for providing a suitable surface for the at least one LED to be fastened to the metal beverage container consists of a second thermally conductive plate placed inside the metal beverage container and attached via mechanical means to the first thermally conductive plate on the outside of the metal beverage container, capturing a portion of the metal beverage container between the two plates and forming a thermal path from the first plate to the metal beverage container.

6. A method of providing a luminaire comprising: providing at least one Light Emitting Diode (LED) device, providing a metal beverage container to which the at least one LED can be fastened, providing an electronic driver circuit for supplying proper voltage and current to the at least one LED, providing at least one thermally conductive plate to provide a suitable surface for the at least one LED to be fastened to the metal beverage container, providing at least one opening cut in the surface of the beverage container to allow the surface of the metal beverage container to be flattened in order to provide a better thermal path from the at least one thermally conductive plate to the outside of the metal beverage container.

* * * * *